US007691188B2

(12) United States Patent
Weber et al.

(10) Patent No.: US 7,691,188 B2
(45) Date of Patent: Apr. 6, 2010

(54) ADSORPTION ELEMENT

(75) Inventors: Olaf Weber, West Bloomfield, MI (US); Stephan Wild, Neuenbuerg (DE); Wolfgang Wenzel, Echterdingen (DE); Daniel Volkmer, Dingolfing (DE); Jens Sohnemann, Landshut (DE); Josef Rohrmeier, Laberweinting (DE); Alfons Schwinghammer, Dingolfing (DE); Frank Pfeiffer, Moensheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 409 days.

(21) Appl. No.: 11/431,022

(22) Filed: May 10, 2006

(65) Prior Publication Data

US 2006/0266220 A1 Nov. 30, 2006

(30) Foreign Application Priority Data

May 11, 2005 (DE) .................. 20 2005 008 505 U

(51) Int. Cl.
*B01D 53/04* (2006.01)
*F02M 35/024* (2006.01)

(52) U.S. Cl. .......................................... 96/134; 55/498

(58) Field of Classification Search .................. 96/108, 96/134, 135, 147, 153; 95/146; 55/498; 123/518–521

See application file for complete search history.

(56) References Cited

U.S. PATENT DOCUMENTS

| | | | | |
|---|---|---|---|---|
| 2,038,071 | A * | 4/1936 | Wilhelm | 96/118 |
| 3,633,343 | A * | 1/1972 | Mark | 96/118 |
| 4,130,487 | A * | 12/1978 | Hunter et al. | 210/85 |
| 4,259,092 | A * | 3/1981 | Matsuo et al. | 95/113 |
| 4,261,717 | A * | 4/1981 | Belore et al. | 96/112 |
| 4,289,513 | A * | 9/1981 | Brownhill et al. | 96/135 |
| 4,350,509 | A | 9/1982 | Alseth et al. | |
| 6,156,089 | A * | 12/2000 | Stemmer et al. | 55/467 |
| 6,440,200 | B1 * | 8/2002 | Sakakibara et al. | 96/134 |
| 2003/0192512 | A1 * | 10/2003 | Luley et al. | 123/519 |
| 2004/0118387 | A1 * | 6/2004 | Lawrence | 123/518 |
| 2005/0081712 | A1 | 4/2005 | Koslow | |
| 2005/0223894 | A1 * | 10/2005 | Sohnemann | 95/143 |

FOREIGN PATENT DOCUMENTS

| | | | |
|---|---|---|---|
| EP | 0 662 340 | A1 | 7/1995 |
| EP | 1 486 661 | A2 | 12/2004 |

OTHER PUBLICATIONS

Australian Search Report Dated May 3, 2006 (seven (7) pages).

* cited by examiner

*Primary Examiner*—Frank M Lawrence

(57) ABSTRACT

An adsorption element for adsorbing gases and vapors from the gaseous atmosphere in the intake tract of an internal combustion engine. The adsorption element is disposed within a wall of a flow cross section carrying the intake air, has a planar adsorption medium along which the intake air flows, and is pleated to create folds in longitudinal direction of the intake stream.

5 Claims, 3 Drawing Sheets

ADSORPTION ELEMENT

BACKGROUND OF THE INVENTION

The present invention relates to an adsorption element for adsorbing vapors and/or gases from an air duct such as the air intake tract of an internal combustion engine.

An important development goal for modern internal combustion engines is a reduction of emissions. Increasing air pollution caused by the internal combustion engines of motor vehicles has led to the development of different testing and rating methods. These increased requirements are forcing automobile manufacturers, particularly in the American market, to minimize the hydrocarbons that leak from the engine's intake tract when a gasoline engine is shut off. It is expected that in the future the limits for these hydrocarbons will be further reduced and that the scope of application will be extended to an increasing number of countries. Thus, the automobile manufacturer is confronted with the problem of retaining the hydrocarbons that flow back when the engine is shut off. To achieve this, plate-like media, which are adapted to adsorb the hydrocarbons flowing past their surface, are disposed in the flow cross-section of the intake tract.

MPC of South Field, Mich. offers, for example, an adsorption element that can be integrated into a round flow cross section of an intake tract. To this end, a plate-shaped adsorption medium is wound parallel to the flow direction of the intake tract. The layers disposed in spiral form side by side are radially spaced apart and are stabilized along the end faces by support structures. A drawback in this embodiment is that the spiral arrangement makes the adsorption element mechanically very unstable so that support structures to impart sufficient rigidity are necessary. These support structures, which take up space in the flow cross section, add flow resistance and increase the cost of materials.

SUMMARY OF THE INVENTION

It is an object of the invention to provide an improved adsorption element for adsorbing gases and/or vapors, e.g. hydrocarbon vapors from the air intake tract of an internal combustion engine.

Another object of the invention is to provide an adsorption element that overcomes the aforementioned drawbacks of the prior art.

A further object of the invention is to provide an adsorption element which can be readily adapted to a wide variety of installation geometries and flow conditions.

These and other objects are achieved in accordance with the present invention by providing an adsorption element for adsorbing gases and vapors from a gas atmosphere in an intake tract of an internal combustion engine; the adsorption element comprising a planar adsorption medium disposed within a wall of a flow cross section which carries intake air such that the intake air flows along the adsorption medium, in which the adsorption medium is pleated to create folds extending in longitudinal direction of the flow of intake air.

The adsorption medium used in the invention is a planar medium that can be placed parallel to the flow direction in an air stream because of its special mechanical properties and its geometric shape. The necessary mechanical stiffness can be achieved by pleating the medium in fanfolds or wave-like folds. The entire intake system of an internal combustion engine, in which the hydrocarbons that are spreading in the direction of the intake opening must be adsorbed when the engine is shut off, comes into consideration as an installation site. The transport process of the hydrocarbons in the direction of the intake opening is by diffusion. The hydrocarbons tend toward a homogenous distribution. The hydrocarbons are adsorbed on the adsorption element, thereby creating a concentration gradient as the driving force for the transport process. When the fluid stream flows back out of the combustion chamber of the engine, the hydrocarbons are deposited on the adsorption element. When the internal combustion engine is running, fresh air flows through the adsorption element. This fresh air is substantially free from hydrocarbons, so that the hydrocarbons desorb from the adsorption medium into the air stream and are burned in the combustion chamber of the internal combustion engine. The folded adsorption medium is positioned in such a way that at least a portion of the sides and the crests of the folds adjoin the margin of the flow cross section or even protrude into the flow cross section.

Depending on the geometric shape of the flow cross section, the fanfolded contour of the adsorption medium may be folded round, oval or even flat. Decisive is that the folds stabilize the medium. The medium may, for instance, be a nonwoven activated carbon fabric, as it is frequently used for interior filters, with the essential difference that the gas stream does not flow through but only along the filter medium. Nonwovens in which activated carbon powder is integrated as a binder and which are compressed firmly enough that their strength resembles that of a cardboard box are also available on the market. A nonwoven fabric of this type is offered by Westvaco, for example, in thicknesses of 0.5 or 1 mm. Another possible adsorption medium is paper made from cellulose with integrated activated carbon powder. Instead of using activated carbon as the adsorption medium it is also possible to use powdered zeolite. To prevent the adsorbents (activated carbon or zeolite) from being released, they must be sealed along their cut end faces. This may be accomplished by dipping the end faces into a molten material or an adhesive.

The invention has the advantage of making it easily possible to use proven media with known material properties to create an adsorption medium that, because of its folds, provides a large surface for efficient adsorption of hydrocarbons in the cross-sectional flow area. The folds also make it possible to create separate flow channels allowing the fluid to flow along the adsorption medium on both sides.

According to one advantageous embodiment of the invention, the medium is connected to an end disk on at least one end face. The end disk may for example be made of a metal, a plastic, a hot-melt adhesive, paper or a nonwoven material. It is of course also possible to create a composite end disk from several of these materials. By connecting the adsorption medium to the end disk, the end faces of the adsorption medium are simultaneously sealed. If an adsorption medium is used where there is a risk that activated carbon dust may leak out, the end disk must have a closed configuration and ensure a tight seal at the joint. An end disk advantageously stabilizes the shape of the adsorption element to ensure greater resistance against the flow forces occurring in the intake tract. It also facilitates handling during installation and removal.

In another advantageous embodiment, a support grid or screen is disposed parallel to the folds of the adsorption medium. This support grid is made from perforated plastic or metal and may for example be folded together with the medium itself. The support grid may extend over a portion or over the entire length of the medium. For fixation, the medium may be bonded to the support grid along the end faces or fastened to the fold crests in sections. The support grid can of course also be embedded in an end disk together with the adsorption medium. The support grid may be made of a fine wire mesh or a perforated foil, for example.

The support grid has the advantage of supporting and stiffening the adsorption medium over a large area without substantially reducing the adsorption capacity. This makes it possible to use adsorption media that are mechanically relatively unstable and to exclude the risk that particles are torn out of the medium while the engine operates in suction mode. This is important especially when the adsorption element is disposed on the filtered side of the intake tract.

According to yet another embodiment of the invention the adsorption element has a core, which is stabilized by a support member. Folding the medium into a hollow shape creates a cavity in the center in which a support member can be disposed. This support member may for instance be a center tube that contacts, and may also be connected to, the crests of the folds. The support member has the role of mechanically supporting the adsorption element and should allow radial flow. The support member may, for example, be embedded into an end disk at one end face. As an alternative, the support member may also protrude axially over the adsorption medium and simultaneously form a fastening and seating contour in an installation structure of the intake tract. A support member has the advantage of stiffening the adsorption element and makes it possible, particularly in connection with closed end disks, to create a stable frame contour for the adsorption element. In addition, connecting the support member to a support grid enclosing the filter medium creates a mechanically highly stable, encapsulated space for receiving soft adsorption media. Although the adsorption medium in this variant is not present directly but only in the margin of the flow cross section, the adsorption of hydrocarbons is still adequate because of the slow mass transport of the hydrocarbon-containing gases and vapors by diffusion.

In yet another advantageous variant, the adsorption element is enclosed by a shell member, which is in fixed communication with the radially outer fold crests of the adsorption medium and/or with the end disk. The shell member provides protection against mechanical damage during transport and installation of the adsorption element. It also simplifies handling during installation and removal.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures, in which.

DETAILED DESCRIPTION OF PREFERRED EMBODIMENTS

Figure 1:
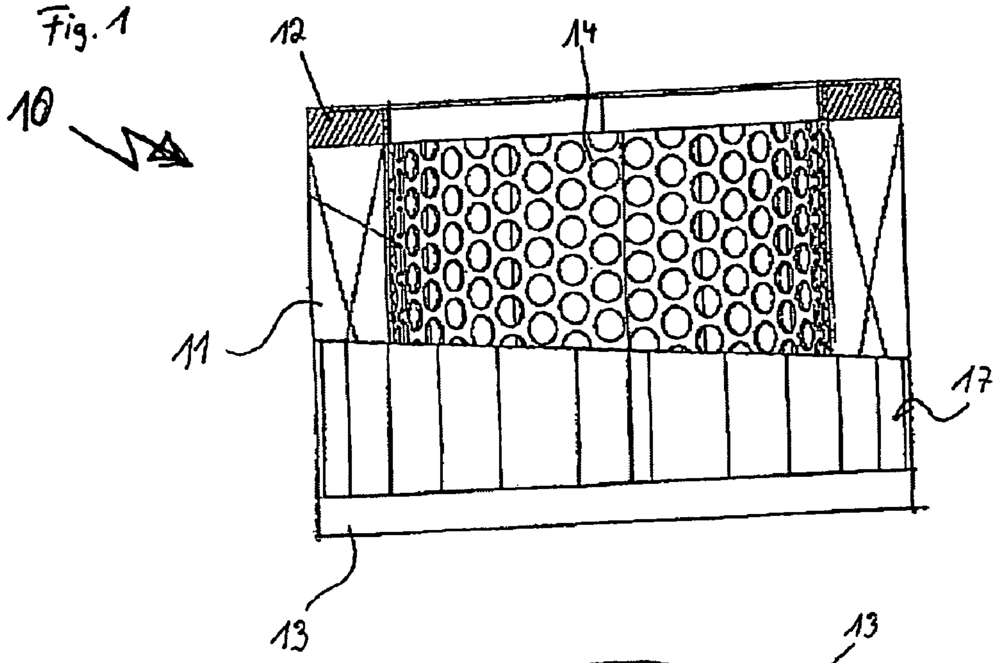
FIG. 1 is a side view of an adsorption element in partial section.

FIG. 1 shows an adsorption element 10 in which an adsorption medium 11 is disposed between a first end disk 12 and a second end disk 13. The adsorption medium 11 is folded into a hollow cylinder and is supported along its radially inner surface by a center tube 14. At both axial end faces of the cylinder, the longitudinal ends of the center tube 14 and the adsorption medium 11 are embedded in the end disks 12, 13. The end disks 12, 13 may, for instance, be made of single- or multi-component synthetic resin materials (i.e., plastics), which are introduced into a shell mold in liquid form and cured after embedding of the adsorption medium 11 and the center tube 14. This makes it possible to produce an end disk from polyurethane foam, a polyurethane resin adhesive or a polyamide casting, for example.

Figure 2:
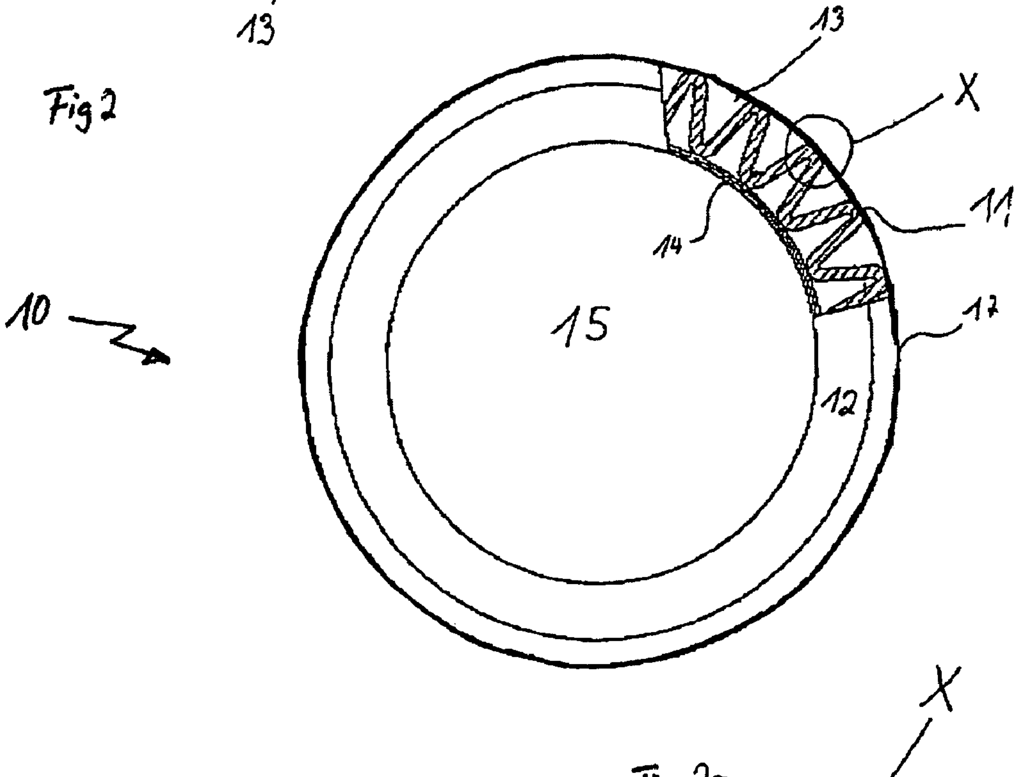
FIG. 2 is a top view of the adsorption element shown in FIG. 1 in partial section.

FIG. 2 shows the hollow cylindrical adsorption element 10, which encloses the flow cross section 15. Components corresponding to those of FIG. 1 are identified by the same reference numbers. Here, the flow cross section 15 corresponds to the duct cross section of an air intake system (not shown in further detail). The pleated adsorption medium 11 is axially embedded between the two end disks 12, 13 and forms an annular space that encloses the flow cross section 15. Radially, the adsorption medium 11 is disposed between the center tube 14 and the shell member 17. The filter medium 11 is spot-bonded at the crests of the folds, with the crests along the radially inner surface being bonded to the center tube 14, and the crests along the radially outer surface bonded to the shell member 17.

Figure 2A:
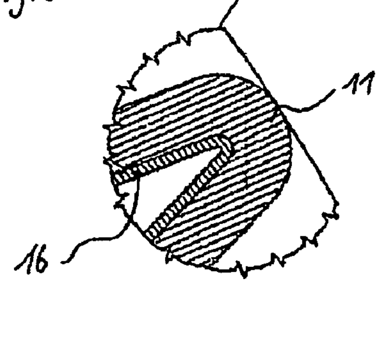
FIG. 2*a* is a detail view "X" from FIG. 2.

FIG. 2*a* shows a detail "X" from FIG. 2. This is a magnified detail of a fold crest of the adsorption medium 11. A support grid or screen 16 extending along the inner surface of the fold crest and parallel to the fold crest supports the contour of the fold and has a mesh tight enough to simultaneously prevent activated carbon particles from leaking out of the medium 11.

Figure 3:
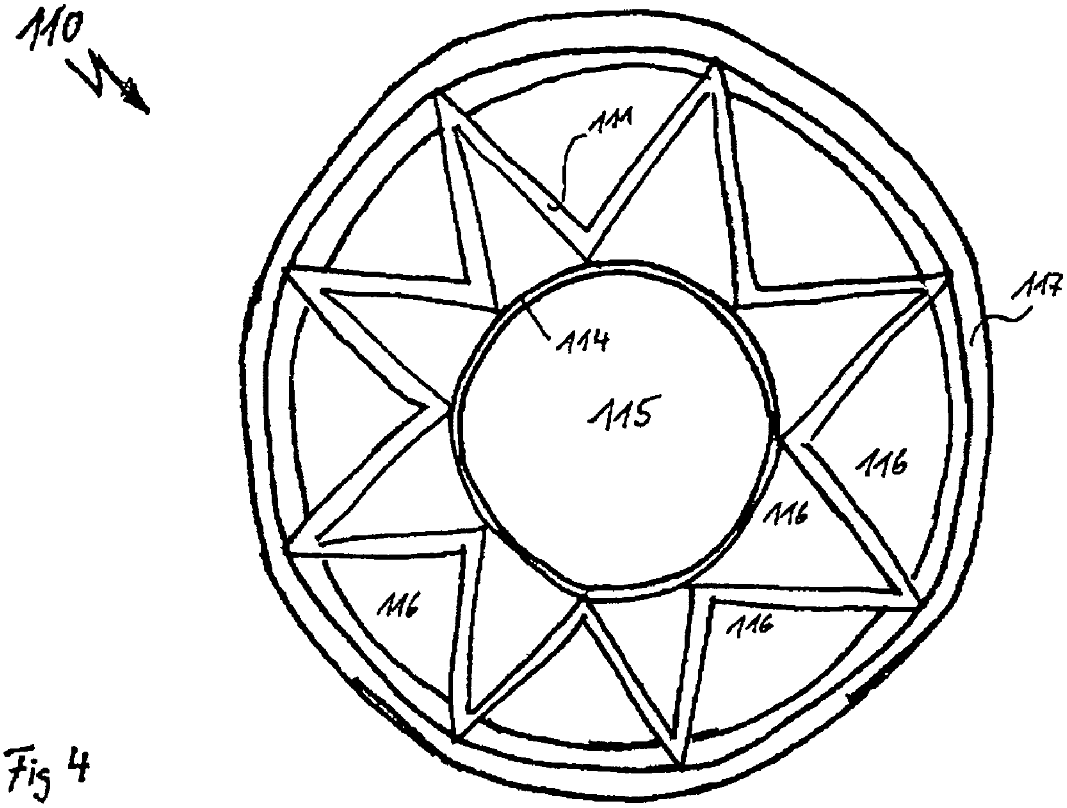
FIG. 3 is a top view of a variant of the adsorption element.

FIG. 3 shows one possible embodiment of an adsorption element 110. Here, an adsorption medium 111 is disposed radially between a carrier member 117 and a support tube 114. A central flow cross section 115 is formed within the adsorption element 110, and a plurality of peripheral flow channels 116 are formed between the fanfolds of the adsorption medium 111. The carrier member 117 is preferably made of a mechanically resistant thermoplastic synthetic resin, which can be integrated into the duct system of an air intake tract. Depending on the mechanical stability of the adsorption medium 111, the medium may be connected on the inner and the outer fold crests to the carrier member 117 or the support tube 114, e.g., by adhesive bonding.

Figure 4:
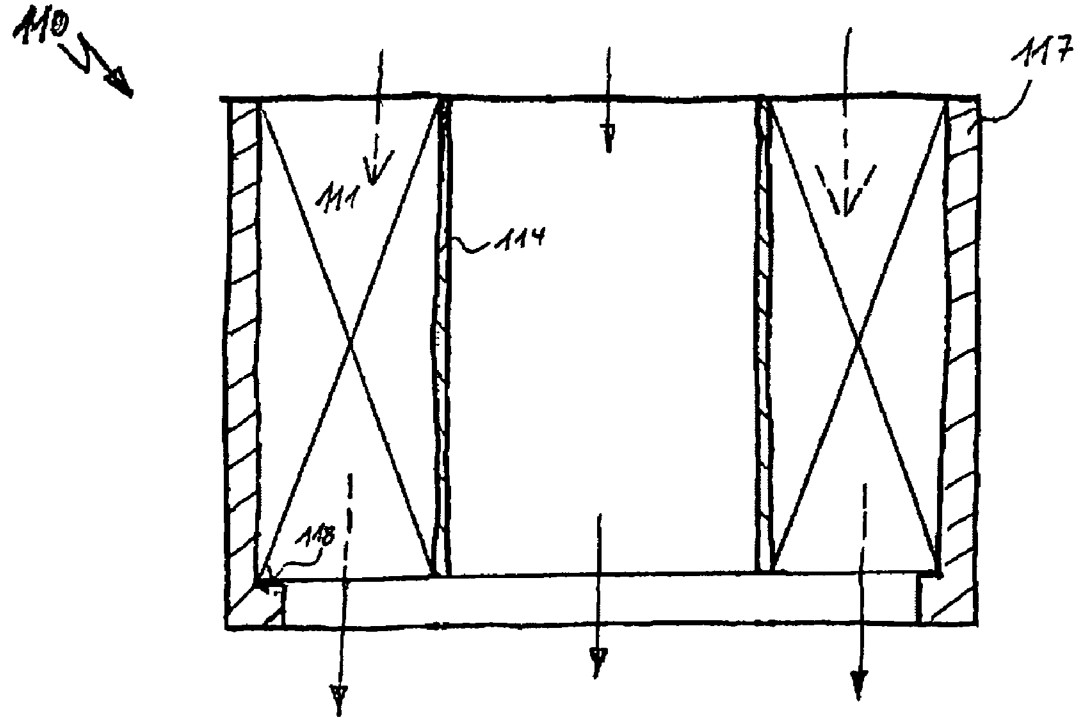
FIG. 4 is a side view of the adsorption element of FIG. 3 in full section.

FIG. 4 shows a side view of the adsorption element of FIG. 3 in a full section. During operation of the internal combustion engine, flow through the adsorption medium 1 11 disposed between the carrier member 117 and the support tube 114 occurs in the direction of the arrows. To prevent the adsorption medium 11 from being carried along by the gas stream, a radial shoulder 118 is disposed on the carrier member 117, against which the adsorption element 111 rests with one end face. The center tube 114 may, for example, be made of a synthetic resin material or metal. With a corresponding mechanical stability, however, it may also, for instance, be made from an adsorption medium.

Figure 5:
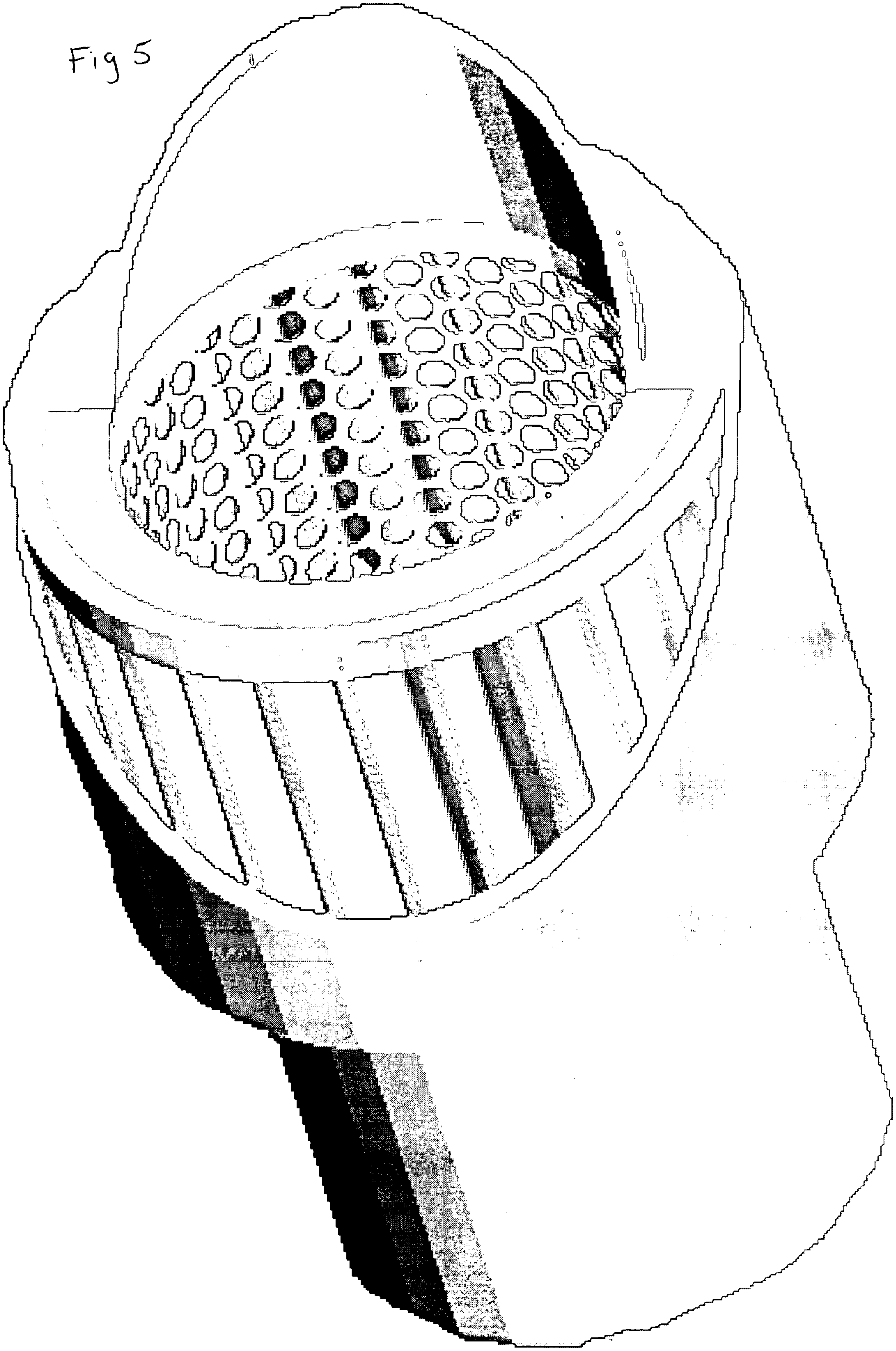
FIG. 5 depicts the adsorption element installed in a duct leading to the intake tract of an internal combustion engine.

FIG. 5 is a depiction of an adsorption element according to the invention installed in a duct leading to an air intake tract of an internal combustion engine.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An adsorption element for adsorbing gases and vapors from a gas atmosphere in an intake tract of an internal combustion engine; said adsorption element comprising an adsorption medium disposed within a wall of a flow cross section which carries intake air such that the intake air flows along the adsorption medium, wherein said adsorption medium is pleated to create folds extending in longitudinal direction of the flow of intake air, a support grid by which the adsorption medium is reinforced that is disposed adjacent to an inward facing surface of the adsorption medium and parallel to each of the pleat surfaces of the folds, the support grid being folded together with the adsorption medium along the pleat surfaces, and an axial end of said adsorption element sized and configured to supportively rest against a shoulder formed on a wall of said intake tract, cooperation of said axial end and shoulder operative to prevent said adsorption medium from being carried along said intake tract by intake air flow.

2. An adsorption element according to claim 1, wherein the adsorption medium has at least one end face connected to an end disk.

3. An adsorption element according to claim 1, wherein the adsorption medium comprises a core stabilized by a support member.

4. An adsorption element according to claim 1, further comprising a shell which encloses the adsorption medium.

5. An adsorption element according to claim 1, wherein the support grid has a mesh sized to prevent particles from leaking out of the adsorption medium through the support grid.

* * * * *